US012800321B2

(12) United States Patent
Yilmaz et al.

(10) Patent No.: US 12,800,321 B2
(45) Date of Patent: Nov. 17, 2026

(54) SYSTEMS, METHODS AND DEVICES FOR MAP-BASED OBJECT'S LOCALIZATION DEEP LEARNING AND OBJECT'S MOTION TRAJECTORIES ON GEOSPATIAL MAPS USING NEURAL NETWORK

(71) Applicant: Ohio State Innovation Foundation, Columbus, OH (US)

(72) Inventors: Alper Yilmaz, Lewis Center, OH (US); Bing Zha, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 19/290,746

(22) Filed: Aug. 5, 2025

(65) Prior Publication Data

US 2025/0362133 A1 Nov. 27, 2025

Related U.S. Application Data

(62) Division of application No. 18/004,614, filed as application No. PCT/US2021/040454 on Jul. 6, 2021, now Pat. No. 12,405,115.

(Continued)

(51) Int. Cl.
*G01C 21/30* (2006.01)
*G01C 21/16* (2006.01)

(Continued)

(52) U.S. Cl.
CPC ......... *G01C 21/30* (2013.01); *G01C 21/1656* (2020.08); *G06N 3/0442* (2023.01); *G06N 3/063* (2013.01)

(58) Field of Classification Search
CPC ................ G01C 21/30; G01C 21/1656; G01C 21/1652; G01C 21/3867; G01C 21/005; G06N 3/0442; G06N 3/063
See application file for complete search history.

(56) References Cited

U.S. PATENT DOCUMENTS

2017/0242133 A1* 8/2017 Yilmaz ................ G01C 21/206
2017/0287142 A1* 10/2017 Xie ......................... A63F 13/35

(Continued)

OTHER PUBLICATIONS

O'Keefe, J., et al, "The hippocampus as a spatial map. preliminary evidence from unit activity in the freely-moving rat," Brain Research, vol. 34, No. I, pp. 171-175, 1971.

(Continued)

*Primary Examiner* — Thomas Ingram
(74) *Attorney, Agent, or Firm* — Benesch Friedlander Coplan & Aronoff LLP

(57) ABSTRACT

An object of initial unknown position on a map may be determined by traversing through moving and turning to establish motion trajectory to reduce its spatial uncertainty to a single location that would fit only to a certain map trajectory. A artificial neural network model learns from object motion on different map topologies may establish the object's end-to-end positioning from embedding map topologies and object motion. The proposed method includes learning potential motion patterns from the map and perform trajectory classification in the map's edge-space. Two different trajectory representations, namely angle representation and augmented angle representation (incorporates distance traversed) are considered and both a Graph Neural Network and an RNN are trained from the map for each representation to compare their performances. The results from the actual visual-inertial odometry have shown that the proposed approach is able to learn the map and localize the object based on its motion trajectories.

7 Claims, 10 Drawing Sheets

Related U.S. Application Data

(60) Provisional application No. 63/064,656, filed on Aug. 12, 2020, provisional application No. 63/049,005, filed on Jul. 7, 2020.

(51) Int. Cl.
*G06N 3/0442* (2023.01)
*G06N 3/063* (2023.01)

(56) References Cited

U.S. PATENT DOCUMENTS

| | | | | |
|---|---|---|---|---|
| 2018/0328753 | A1* | 11/2018 | Stenning | G01C 21/08 |
| 2019/0147610 | A1* | 5/2019 | Frossard | G06T 7/20 382/103 |
| 2020/0271458 | A1* | 8/2020 | Berry | G01C 21/34 |

OTHER PUBLICATIONS

O'Keefe, J., "Place units in the hippocampus of the freely moving rat," Experimental Neurology, vol. 51, No. 1, pp. 78 109. 1976.
Erdem, U. M., et al., "A goal-directed spatial navigation model using forward trajectory planning based on grid cells." European Journal of Neuroscience, vol. 35, No. 6, pp. 916-931, 2012.
Hofmann-Wellenhof, B., et al, Global positioning system: theory and practice. Springer Science & Business Media, 2012.
Hafting, T., et al., "Microstructure of a spatial map in the entorhinal cortex," Nature, vol. 436, No. 7052, pp. 801-806, 2005.
Bush, D., et al., "Using grid cells for navigation," Neuron, vol. 87, No. 3, pp. 507-520, 2015.
Evardsen, V., et al., "Navigating with grid and place cells in cluttered environments," Hippocampus, vol. 30, No. 3, pp. 220-232. 2020.
Tolman, E. C., "Cognitive maps in rats and men.," Psychological review, vol. 55. No. 4, p. 189, 1948.
Geiger, A, et al., "Are we ready for autonomous driving? the kitti vision benchmark suite," in 2012 IEEE Conference on Computer Vision and Pattern Recognition, pp. 3354-3361, IEEE. 2012.
Cadena, C., et al., "Past, present, and future of simultaneous localization and mapping: Toward the robust-perception age," IEEE Transactions on robotics. vol. 32, No. 6. pp. 1309-1332, 2016.
Elfes, A, "Using occupancy grids for mobile robot perception and navigation," Computer, vol. 22. pp. 46-57, Jun. 1989.
Boal, J., et al., "Topological simultaneous localization and mapping: a survey," Robotica, vol. 32, No. 5, pp. 803-821, 2014.
Tomatis, N., et al., "Hybrid simultaneous localization and map building: a natural integration of topological and metric," Robotics and Autonomous systems, vol. 44, No. 1, pp. 3-14, 2003.
Milford, M. J., et al., "Ratslam: a hippocampal model for simultaneous localization and mapping," in IEEE International Conference on Robotics and Automation, 2004. Proceedings. ICRA '04. 2004, vol. 1, pp. 403-408, IEEE, 2004.
Milford, M., et al., "Persistent navigation and mapping using a biologically inspired SLAM system," The International Journal of Robotics Research, vol. 29, No. 9, pp. 1131-1153, 2010.
Sattler, T., et al., "Fast image-based localization using direct 2d-to-3d matching," in 2011 International Conference on Computer Vision, pp. 667-67 4, IEEE, 2011.
Walch, F., et al., "Image-based localization using lstms for structured feature correlation," in Proceedings of the IEEE International Conference on Computer Vision, pp. 627-637, 2017.
Fox, D., et al., "Monte carlo localization: Efficient position estimation for mobile robots," AAAI/IAAI, vol. 1999. No. 343-349. pp. 2-2, 1999.
Brubaker, M. A, et al., "Map-based probabilistic visual self-localization," IEEE transactions on pattern analysis and machine intelligence. vol. 38, No. 4, pp. 652-665, 2015.
Gupta, A, et al., "Gps-denied geo-localisation using visual odometry," ISPRS Annual Photogrammetry, Remote Sensing Spatial Information Science, pp. 263-270, 2016.
Newson, P., et al., "Hidden markov map matching through noise and sparseness," in Proceedings of the 17th ACM SIGSPATIAL international conference on advances in geographic information systems, pp. 336-343, 2009.
Barry, C., et al., "The boundary vector cell model of place cell firing and spatial memory," Reviews in the Neurosciences, vol. 17. No. 1-2, p. 71, 2006.
Wei, J., et al., "Pedestrian localization on topological maps with neural machine translation network," in 2019 IEEE Sensors, pp. 1-4, IEEE, 2019.
Zha, B., et al., "Trajectory mining for localization using recurrent neural network," in 2019 International Conference on Computational Science and Computational Intelligence (CSCI), pp. 42-45. IEEE. 2019.
Fyhn, M., et al., "Spatial representation in the entorhinal cortex," Science, vol. 305, No. 5688, pp. 1258-1264. 2004.
Elman, J. L., "Finding structure in time," Cognitive science, vol. 14. No. 2, pp. 179-211, 1990.
Scaramuzza, D., et al., "Visual odometry [tutorial]," IEEE robotics & automation magazine, vol. 18, No. 4, pp. 80-92, 2011.
Hartley, R., et al., "Multiple view geometry in computer vision", Cambridge university press, 2003.
Sedgewick, R., "Algorithms in c, part 5: Graph algorithms," 2002.
Qin, T., et al., "A general optimization-based framework for local odometry estimation with multiple sensors," arXiv preprint arXiv:1901. 03638, 2019.
Douglas, D. H., et al., "Algorithms for the reduction of the number of points required to represent a digitized line or its caricature." Cartographic a: the international journal for geographic information and geovisualization, vol. 10, No. 2, pp. 112-122, 1973.
Jimenez, AR., et al., "A comparison of pedestrian dead-reckoning algorithms using a low-cost MEMS IMU," in IEEE! International Symposium on Intelligent Signal Processing, pp. 37-42, Aug. 2009.
Aggarwal, P., et al., "Map matching and heuristic elimination of gyro drift for personal navigation systems in GPS-denied conditions," Measurement Science and Technology. vol. 22.
Dionti, T.A., et al., "Indoor routing in three dimensional spaces," in 5th, International Conference on Information and Communication Technology (J.ColC7), pp. 1-5. May 2017 [4J "OpenStreetMaps." https://www.openstreetmap.org.
Wang, Z., et al., "data model for using openstreetmap to integrate indoor and outdoor route planning," Sensors, vol. 18, p. 2100, Jun. 2018.
Quddus, M. A, et al., "Current ma00matching algorithms for transport applications: State-of-the art and future research directions," Transportation Research Part C: Emerging Technologies, vol. 15. No. 5, pp. 312-328, 2007.
Greenfield, J. S., "Matching gps observations to locations on a digital map," Proceedings of the 81-th Annual Meeting of the Transportation Research Board. pp. 1-13, fan 2002.
Shin, S.H., et al, "New map-matching algorithm using virtual track for pedestrian dead reckoning," ETRI Jounial, vol. 32, Dec. 2010.
Gillieron, P. Y., et al., "Indoor navigation enhanced by map-matching," European Journal of Navigation, vol. 3, No. 3. 2005.
Spassov, I., et al., "Map matching for pedestrians via Bayesian inference," in European Navigation Conference Global Navigation Satellite Systems, May 2006.
Willemsen, T., et al., "A topological approach with MEMS in smartphones based on routing-graph," in International Conference on Indoor Positioning and indoor Navigation (IPIN), pp. 1-6, Oct. 2015.
Alaoui, F. T., et al., "A multi-hypothesis particle filtering approach for pedestrian dead reckoning," in 2016 International Conference on Indoor Positioning and Indoor Navigation (IPN), pp. 1-8, Oct. 2016.
Alaoui, F. T., et al., "Pedestrian dead reckoning navigation with the help of A-based routing graphs in large unconstrained spaces," Wireless Communications' and Mobile Computing, vol. 2017. pp. 1-10, Jul. 2017.
Jiang, J., et al., "Lightweight topological-based map matching for indoor navigation," in 2016 30th International Conference on Advanced Information Networking and Applications Workshops (WAINA), pp. 908-913, Mar. 2016.

(56) References Cited

OTHER PUBLICATIONS

Yilmaz, A et al., "Indoor positioning using visual and inertial sensors," in 2016 IEEE Sensors. pp. 1-3, Oct. 2016.

Chen, K. et al., "A behavioral approach to visual navigation with graph localization networks," arXiv preprin arXiv: 1903.00445, 2019.

Fischer, C., "Tutorial: implementing a pedestrian tracker using inertial sensors," IEEE Pervasive Computing, vol. 12, pp. 17-27, Apr. 2013.

Harle, R., "A survey of indoor inertial positioning systems for pedestrians," IEEE Communications Surveys Tutorials, vol. 15. pp. 1281-1293. Third 2013.

Intemational Search Report and Written Opinion in International Application No. PCT/US21/40454, dated Oct. 26, 2021 (8 pages).

* cited by examiner

LSTM Cell

VS.

RNN Cell (a) Hypotheses Generation: Strategy 1.

(a) Hypotheses Generation: Strategy 2.

SYSTEMS, METHODS AND DEVICES FOR MAP-BASED OBJECT'S LOCALIZATION DEEP LEARNING AND OBJECT'S MOTION TRAJECTORIES ON GEOSPATIAL MAPS USING NEURAL NETWORK

RELATED APPLICATION

The present application is a divisional application of U.S. Non-Provisional Patent application Ser. No. 18/004,614 entitled "Systems, Methods and Devices for Map-Based Object's Localization Deep Learning and Object's Motion Trajectories on Geospatial Maps Using Neural Network", filed on Jan. 6, 2023, which is a U.S. national stage entry of International Application No. PCT/US2021/040454, filed on Jul. 6, 2021, which claims priority to and the benefit from U.S. Provisional Patent Application Ser. No. 63/049,005 entitled "Systems, Methods and Devices For Map-Based Object Localization Using Deep Learning", filed on Jul. 7, 2020, and U.S. Provisional Patent Application Ser. No. 63/064,656 entitled "Systems, Methods and Devices For Learning Objects' Motion Trajectories On Maps Using Deep Learning For Temporally consistent Geo-Localization", filed on Aug. 12, 2020, the contents of which are herein incorporated by reference in their entirety for all purposes.

TECHNICAL FIELD

This disclosure generally relates to systems, methods, and devices for map-based object localization deep learning and object's motion trajectories on geospatial maps using neural networks.

BACKGROUND

Without the loss of generality, object localization can be defined as finding where an object is on a map given sensory data. Object localization is important and necessary for not only core applications, like robotics and autonomous ground and aerial vehicles, but also tracking of pedestrians for surveillance or health reasons. Despite advances in the field, localization is still a challenging problem especially when Global Positioning System (GPS) data is contested, such as degraded or not available.

The most popular positioning or localization technology for the outdoor environment is GPS, which utilizes georeferenced satellite constellation to estimate the object's location (Hofmann-Wellenhof et al., 2012). However, the limitations are also notable: GPS is not accurate for especially civilian and consumer applications, and the signal suffers from multi-path problems and may be unavailable or unreliable in several areas, such as underground, in tunnels, indoors, urban canyons and in planetary missions. To resolve these limitations, researchers have proposed Indoor Positioning Systems (IPS) (Mautz, 2012) to localize objects using installed infrastructure, such as WiFi, Bluetooth, UltraWide Band (UWB), etc. Despite being a fast growing research area, IPS technology using external signals requires large investment and has high maintenance cost.

SUMMARY

In an embodiment, a method for generating object positioning is discussed, the method including: in response to receiving motion based relative position signals $\{s_1, s_2 \ldots s_n\}$ generated from the at least one device of an object that traverses within a map M, wherein the map M is represented as a graph G, including a plurality of nodes $V=\{v_1, v_2 \ldots v_n\}$ and a plurality of edges $E=\{e_1, e_2 \ldots e_n\}$, wherein: each of the nodes $\{v_1, v_2 \ldots v_n\}$ is assigned with a unique identification which represents a place and other features attributed to that place at a certain time sequence, and each of the edges $\{e_1, e_2 \ldots e_n\}$ is assigned with a unique identification which represents a traversable path between the nodes.

An algorithm stored in a memory may be executed by a processor, in the at least one device of the object to perform steps, including: (a) extracting, by the processor of the at least one device of the object, the motion based relative position signals $\{s_1, s_2 \ldots s_n\}$ generated from the at least one device of the object to obtain time sequenced edges $\{\ldots e_{i-1}, e_i, e_{i+1}, e_{i+2} \ldots\}$ and nodes $\{\ldots v_{i-1}, v_i, v_{i+1}, v_{i+2} \ldots\}$ information traversed by the object at time t at node $v_i$, such that the object at the at node $v_i$ either makes a turn or continues to move in one direction, wherein the node $v_i$ is associated with a distance $l_i$ traversed and a turning angle φi which represents directional information formed at the node $v_i$ between a previous edge $e_{i-1}$ and a next edge $e_{i+1}$ of the object has traversed; (b) generating, by the processor, a relative motion trajectory $T_r$ of the object over n nodes $\{v_1, v_2 \ldots v_n\}$ from one or both of n−1 distances $\{l_1, l_2 \ldots l_{n-1}\}$ and n−2 turning angles {φ1 . . . φn−2} computed from the motion based relative position signals $\{s_1, s_2 \ldots s_n\}$; (c) quantizing the n−2 turning angles {φ1 . . . φn−2} to identify a given discrete bin for each relative motion trajectory $T_r$ at the time t from a plurality of discrete bins; (d) training a neural network model that maps the graph G to an embedding space Z based on object traversable edges $\{e_1, e_2 \ldots e_n\}$ and nodes $\{v_1, v_2 \ldots v_n\}$ to learn object's motion trajectories j on the map M; and (e) generating a geolocation $A_x$ of the object according to the trained neural network within the map M and the embedding space Z.

In another embodiment, a method for determining object motion trajectories is discussed, the method including: in response to receiving motion based sequence of discrete distances and directions of object's trajectories at time t generated from at least one device of an object that traverses within a topological map M, executing by a processor, an algorithm stored in a memory of the at least one device of the object to perform steps, including: determining a geolocation probability $P_{loc}$ of an object according to a sequence of discrete distances and directions of object's trajectories at time t, wherein the geolocation probability $P_{loc}$ of the object's motion trajectories as equation (1):

$$P_{loc} = P(s_t | \phi, \beta_{1:t}, M) \quad (1)$$

where, $s_t$ is an output edge id, and the $P_{loc}$ indicates an output result conditioned on the topological map, M, and the sequence of direction with a turning angle ϕ at a node and a distance β between nodes, where t is time sequence.

DETAILED DESCRIPTION

Figure 1A:
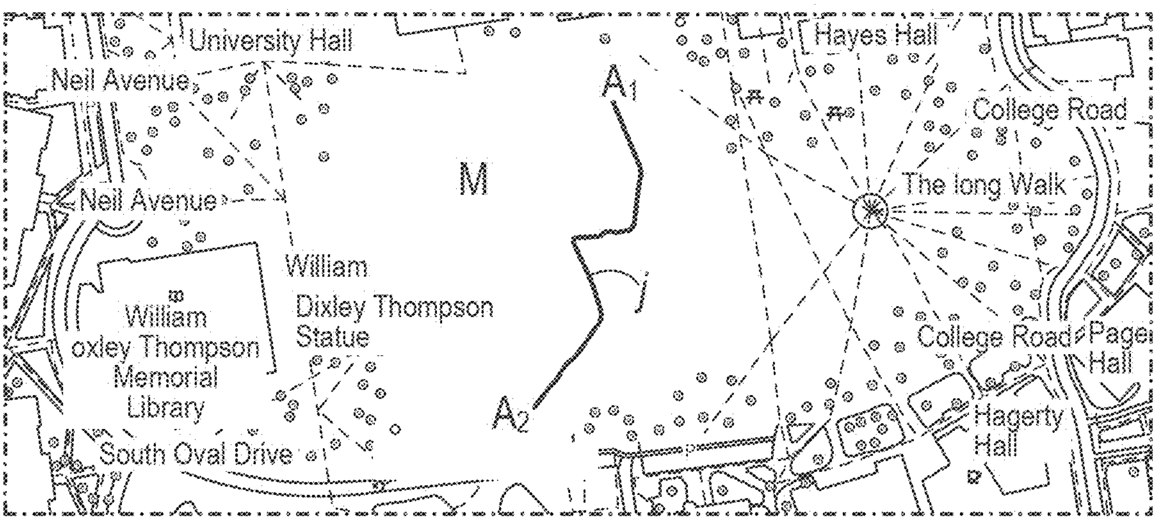
FIG. 1A illustrates a trajectory of an object traveling within a topological map from one geolocation to another geolocation.

Studies show that positioning and navigation in mammals rely on the ability to form neural maps of the environmental space. Recent studies on biological systems have revealed that navigation system consists of several specialized cells (place cell, grid cell, head direction cell, and border cell etc.) which collectively form a map representation of space that not only operates in the present but also can be stored as a memory for later use. The disclosure mimics a concept of map-like representation of place in the brain "cognitive map" or specialized neural networks that enable animals to navigate and find its position in an environment.

Stimuli that help humans to achieve positioning on a map, for instance a blind person or in deep dark night, is based on the distances they traversed and corners they turned. A simple example would be getting directions for an unknown location from others, e.g., "to get to the grocery, go straight 100 meters (moving) and turn left (turning)".

An object of initial unknown position on a map may be determined by traversing through moving and turning to establish motion trajectory to reduce its spatial uncertainty to a single location that would fit only to a certain map trajectory. In the disclosure, the method or algorithm may use a topological map-based approach using motion trajectory as training data to achieve self-localization is developed. Formally, given a sequence of distances and turning angles along with a map, the method or algorithm may sequentially predict which edge is located. In fact, the movement of object on a graph may be physically constrained by the condition of the topology of an underlying road network.

In order to guarantee a connectivity of edge prediction, the method or algorithm may adopt hypotheses generation and pruning strategy. Moreover, due to distance information needed, the approach requires that absolute scale of motion trajectory which may directly lead to employing stereo visual odometry method to obtain motion trajectory.

The following sections describe how this process may be done. Firstly, topological map-based geolocation process may be proposed through trajectory learning, including map representation, motion trajectory representation and (artificial) neural network architecture. Then, two different strategies may be used to deal with temporal consistency of location. Lastly, a visual odometry method on how to obtain metric motion trajectory may be proposed.

More specifically, the two different approaches to determine the object's location and its trajectory may include: Recurrent Neural Network (RNN) and Graph Neural Network (GNN). Both projects the map and the motion into an embedding space Z. RNN has a recursive structure that implicitly models the motion information. The GNN has a message passing strategy that defines the motion of the object on the map.

A Graph Neural Network (GNN) based model or a Recurrent Neural Network (RNN) model may learn from an object's trajectory motion on different map topologies and may establish the object's end-to-end localization from mapping topologies. The proposed method includes learning potential motion patterns from the map and perform trajectories classification in the map's edge-space. Two different trajectories representations, namely angle representation and augmented angle representation (incorporates distance traversed) are considered and the RNN is trained from the map for each representation to compare their performances. The results from the actual visual-inertial odometry have shown that the proposed approach is able to learn the map and localize the object based on its motion trajectories. Hence, a general pipeline (to be discussed in FIGS. 3 and 4) for generating a sequence of motion features may be used in motion learning and retrieving the object location.

Figure 1B:
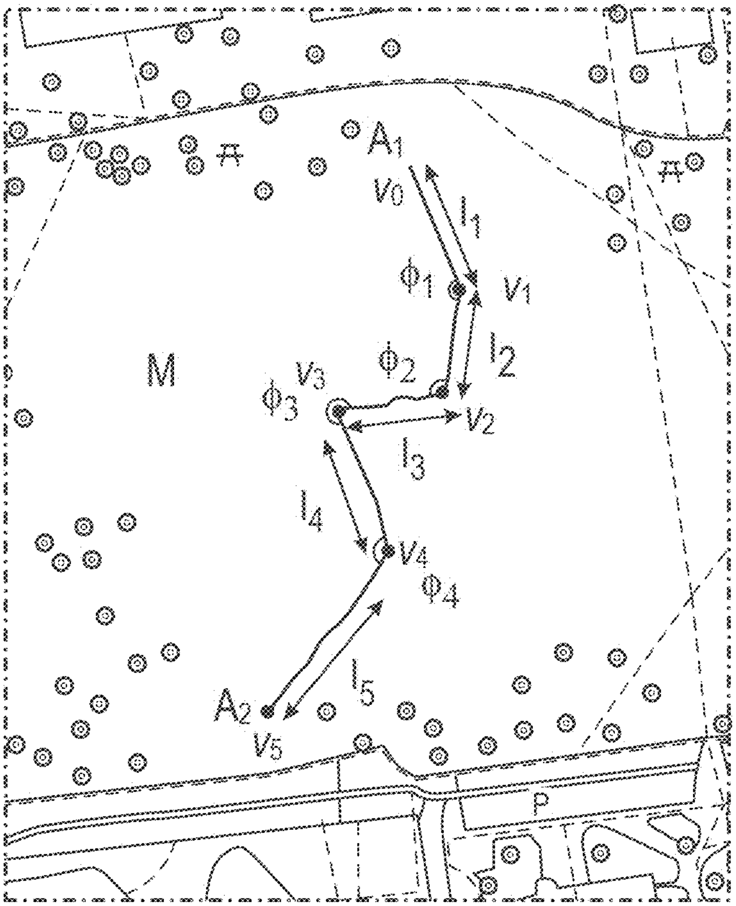
FIG. 1B illustrates a motion trajectory representation using local turning angles and distances.

FIG. 1A illustrates an OpenStreetMap (OSM) representation motion trajectory 102 of an object traveling within a topological map M from one geolocation $A_1$ to another geolocation $A_2$. FIG. 1B illustrates the motion trajectory 102 representation of the object generated as a result of object's motion on the topological map M which consists of a sequence of distances $\{l_1, l_2 \ldots l_6\}$ (i.e., (i.e., $l_1, l_2 \ldots l_{n-1}$) traversed and local turning angles $\{\varphi 1 \ldots \varphi 4\}$ (i.e., $\varphi 1 \ldots \varphi n-2$) taken. In an example, the map M may be represented as a graph G, including a plurality of nodes $V=\{v_1, v_2 \ldots v_n\}$ and a plurality of edges $E=\{e_1, e_2 \ldots e_n\}$, wherein: each of the nodes $\{v_1, v_2 \ldots v_2\}$ is assigned with a unique identification which represents a place and other features attributed to that place at a certain time sequence t, and each of the edges $\{e_1, e_2 \ldots e_n\}$ is assigned with a unique identification which represents the traversable path (i.e., trajectory 102) between the nodes $v_0$ (geolocation $A_1$) and $v_5$ (geolocation $A_2$).

Figure 1C:
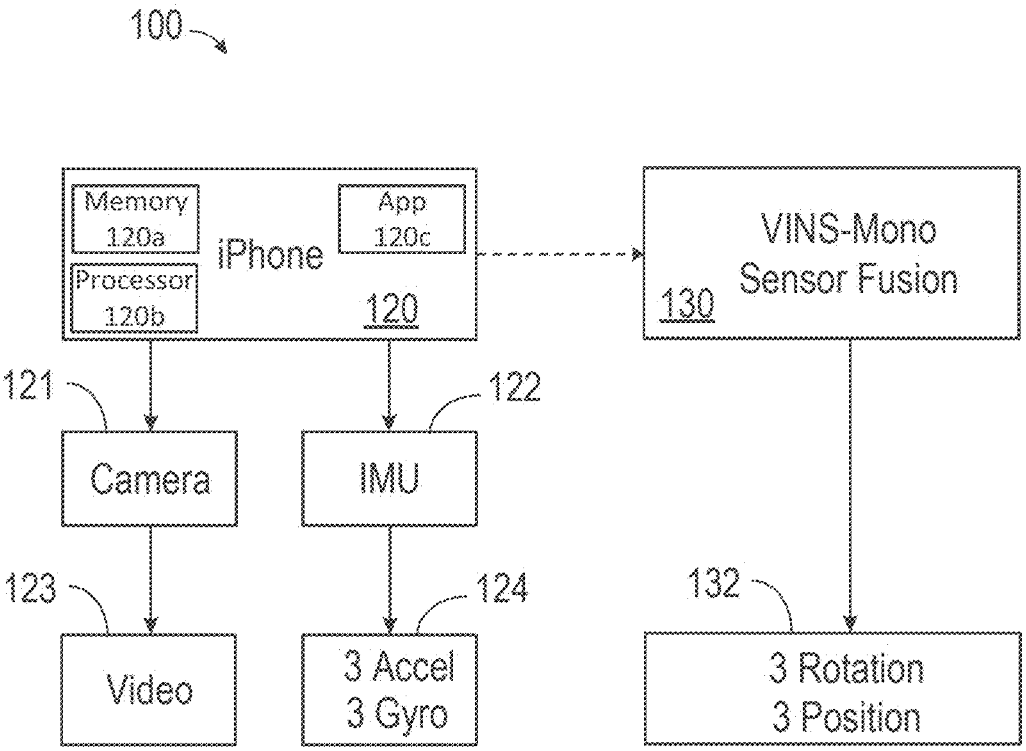
FIG. 1C illustrates a visual inertial odometry (VIO) which is used for motion data collection and processing.

FIG. 1C illustrates at least one device (e.g., visual inertial odometry (VIO) device 100) which may be used for generating and processing motion based relative position signals $\{s_1, s_2 \ldots s_n\}$ which include time sequenced edges $\{\ldots e_{i-1}, e_i, e_{i+1}, e_{i+2} \ldots\}$ and nodes $\{\ldots v_{i-1}, v_i, v_{i+1}, v_{i+2} \ldots\}$ traversed by the object on the map M to determine and learn its geolocation or motion trajectory as shown in FIG. 1B. In an example, the VIO device 100 may include a mobile smart phone 120. Visual inertial odometry is a process of estimating the pose (position and orientation) of the object using both a camera 121 and an inertial measurement unit (IMU) 122 on the VIO 100 that measures two dimensional (2-D) or three dimensional (3D) accelerations and orientation by a gyroscope. An open source mobile smart-phone application 120_c_ may be developed for collecting synchronized video data 123 and IMU data 124 (3 acceleration and 3 angular velocity).

In other examples, the VIO device 120 may also include a Light Detection and Ranging (LIDAR) structured light sensors (depth sensors) or a sound navigating ranges (SONAR) (under water depth sensors). In an example of the method, the motion based relative position signals are generated in two-dimensional (2-D) having one angle and one distance, or in three-dimensional (3-D) space having two angles (e.g., with z axis and polar coordinates) and two distances.

In implementation, in response to receiving motion based relative position signals {s1, s2 . . . sn} generated by the VIO device 120 that traverses within the map M, a processor 120*b* of the VIO device 120 may execute an algorithm stored in a memory 120*a* to perform steps, including: (a) extracting the generated motion based relative position signals $\{s_1, s_2 \ldots s_n\}$ of the object to obtain time sequenced edges $\{\ldots e_{i-1}, e_i, e_{i+1}, e_{i+2} \ldots\}$ and nodes $\{v_{i-1}, v_i, v_{i+1}, v_{i+2} \ldots\}$ information traversed by the object at time t at node $v_i$, such that the object at the at node $v_i$ either makes a turn or continues to move in one direction, wherein the node $v_i$ is associated with a distance $l_i$ traversed and a turning angle φi which represents directional information formed at the node $v_i$ between a previous edge $e_{i-1}$ and a next edge $e_{i+1}$ of the object has traversed; (b) generating, by the processor 120*b*, a relative motion trajectory $T_r$ of the object over n nodes $\{v_1, v_2 \ldots v_n\}$ from one or both of n−1 distances $\{l_1, l_2 \ldots l_{n-1}\}$ and n−2 turning angles {(φ1 . . . φn−2} computed from the motion based relative position signals $\{s_1, s_2 \ldots s_n\}$; (c) quantizing the n−2 turning angles {φ1 . . . φn−2} to identify a given discrete bin for each relative motion trajectory $T_r$ at the time t from a plurality of discrete bins; (d) training a neural network model that maps the graph G to an embedding space Z based on object traversable edges $\{e_1, e_2 \ldots e_n\}$ and nodes $\{v_1, v_2 \ldots v_n\}$ to learn object's motion trajectories j on the map M; and (e) generating a geolocation $A_x$ of the object according to the trained neural network within the map M and the embedding space Z.

As shown in FIG. 1C, sensor fusion may be performed by open-source VINS-Mono approach (Qin et al., 2018) that provides high-accuracy visual inertial odometry in the form of three rotation and three position data 132 with relative scale information.

Figure 2:
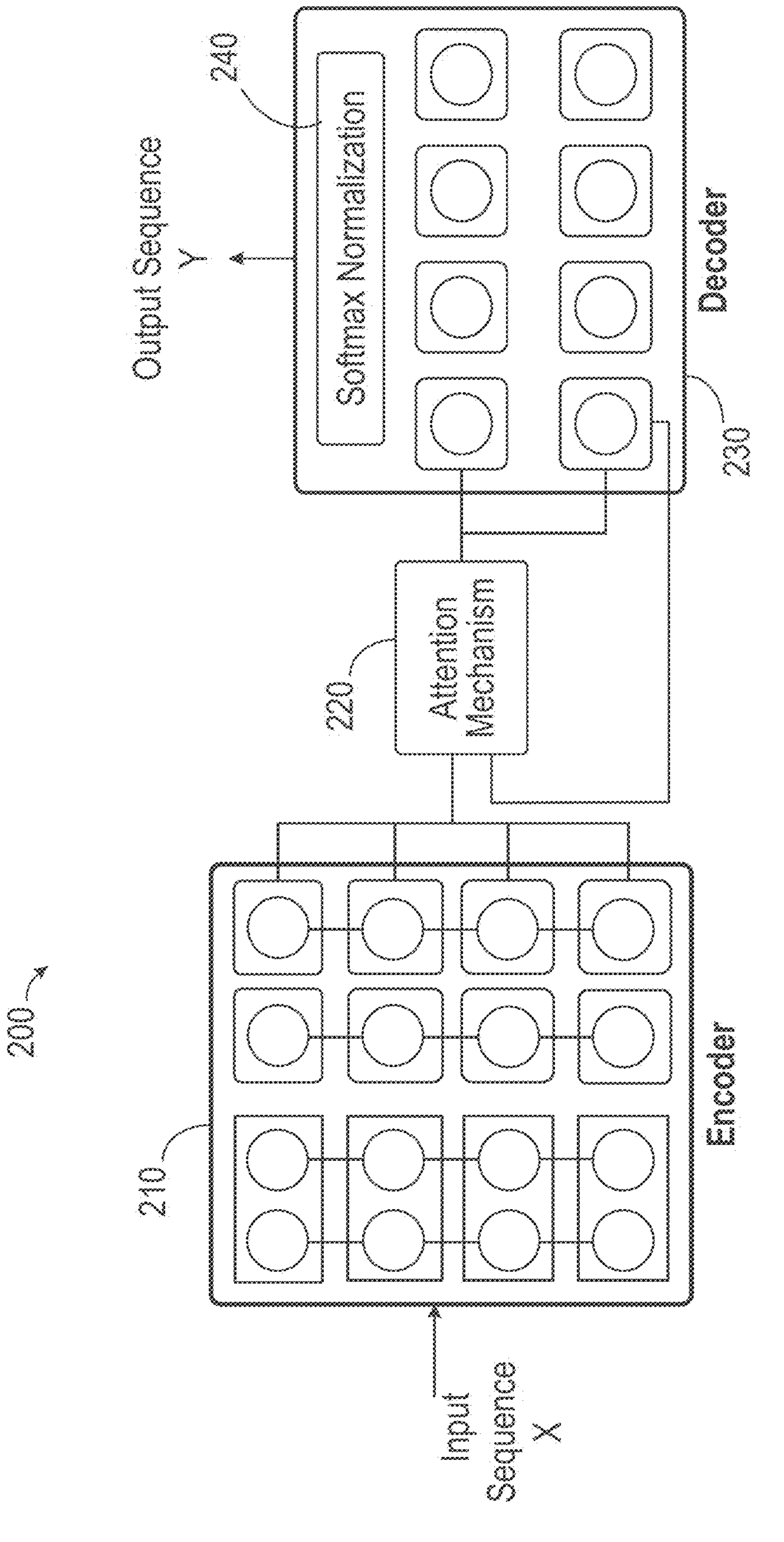
FIG. 2 illustrates a neural machine translation network with attention mechanism for predicting accuracy rate in future steps based on an input sequence.

FIG. 2 illustrates a Neural Machine Translation (NMT) network 200 with attention mechanism 220 may be used to predict accuracy rate in future steps based on an input training data, such as feature sequence: X=(φ1, φ2, . . . φn) (where $\varphi^{i} \in R$, (i=1, 2 . . . n), n is a length of sequence, and $\varphi^i$ is ith angle, wherein $l_1, l_2 \ldots l_{n-1}$ are distances of the sequence) which feature sequence X is the motion based relative position signals $\{s_1, s_2 \ldots s_n\}$ extracted from trajectories consisting of n nodes. Based on a format of input and output training data, a sequence-to-sequence model may be implemented to predict an accuracy rate in future steps. This model takes a sequence of features X and produces another sequence with encoder-decoder mechanism where encoder and decoder are both Recurrent Neural Network (RNN). An attention mechanism over the encoder Long Short Term Memory (LSTM) states may provide a random access memory to source hidden states that can be accessed throughout the translation process. In another embodiment, the input sequence of features X are not limited only to the extracted features from motion based relative position signals, they may be words and letters from written script or speech.

In an example, there may be three types of input training data sequence formed, namely, angle sequence (range between 0 and π), length sequence l, and angle-length sequence combining both angle and length. The training may include: (a) reducing the computational complexity by quantizing the angle $\varphi^i$ into 72 bins (2.5° bin size), (b) map the quantized angle $\varphi^i$ values between [0, 1], i.e., normalization, and extends 72 bins to 1001 bins in improving prediction accuracy in equation (2):

$$\phi_{normalized} = \frac{\phi_{original} - \phi_{min}}{\phi_{max} - \phi_{min}}, \quad (2)$$

and (c) perform preprocessing on unique edge lengths with ordered integers such as 1, 2 and 3, and normalize while keeping same three decimals resolution in equation (3):

$$l_{normalized} = \frac{l_{original} - l_{min}}{l_{max} - l_{min}}. \quad (3)$$

Figure 3:
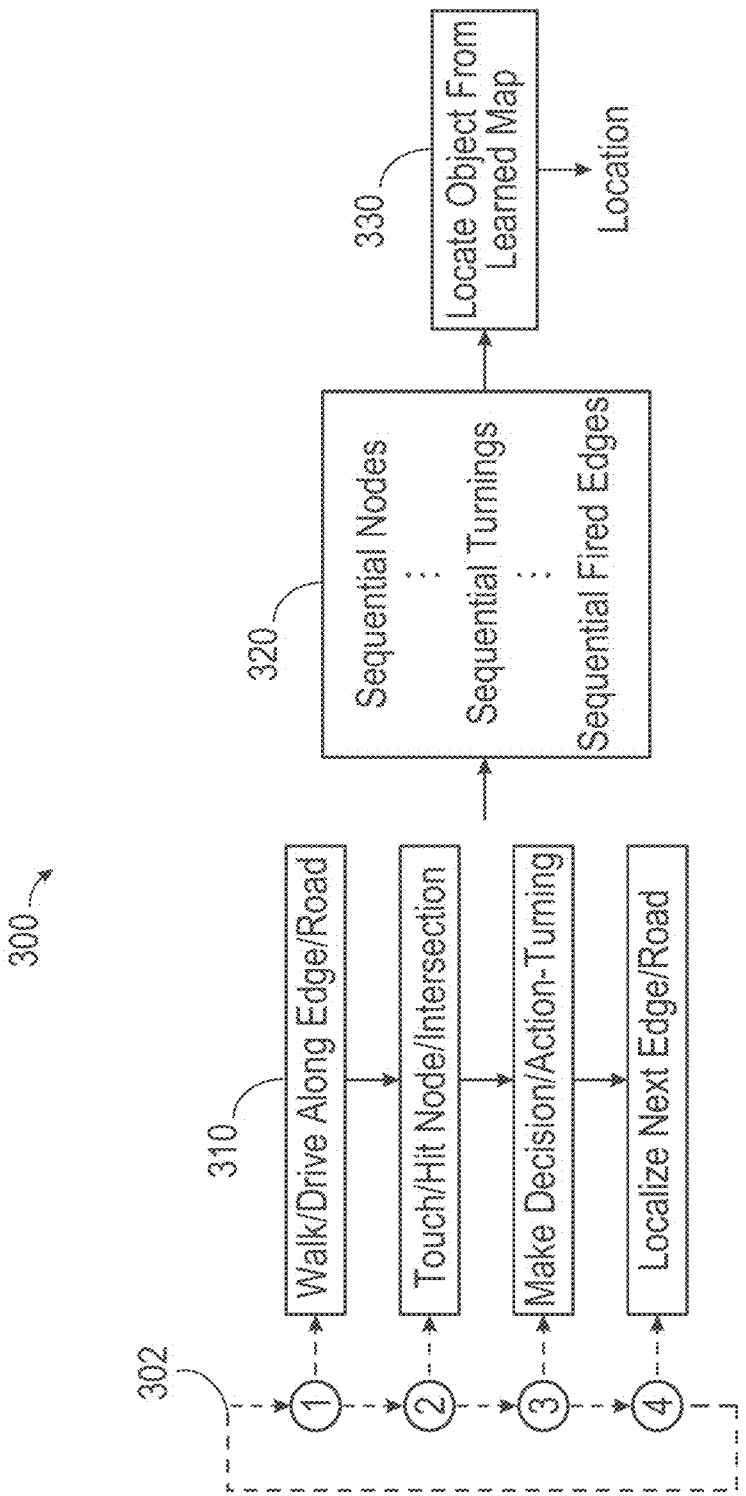
FIG. 3 illustrates an example of pipeline processing by an Artificial Neural Network (ANN) model for generation of a sequence of motion features used in motion and object location learning.
Figure 4:
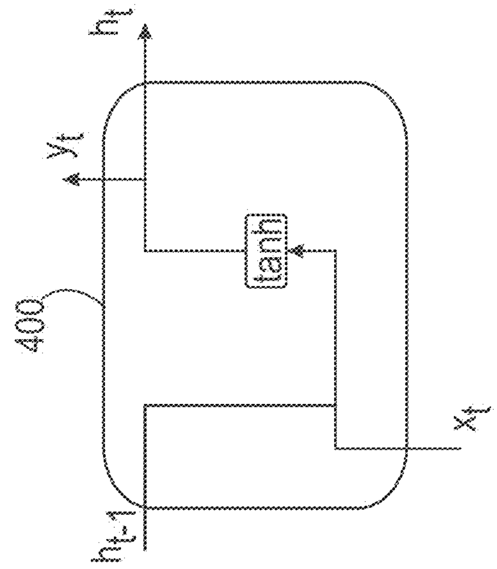
FIG. 4 illustrates a structure of an RNN cell.

FIG. 3 illustrates an example of pipeline processing 300 by an Artificial Neural Network (ANN) model for generation of a sequence of motion features used in motion and object location learning. The box 330 in FIG. 3 is an Artificial Neural Network (ANN) model, such as recurrent neural network (RNN) or Graph Neural Network (GNN), that learns how objects move on different map topologies to establish an end-to-end object geolocation positioning. The techniques described here includes learning motion patterns from the map and perform positioning as trajectory classification in the map's edge-space.

Borrowed from mammal navigation system, the trajectory is converted into a feature space constructed of two different trajectory representations, namely angle representation (direction cell in brain) and augmented representation based on incremental distances (grid cell). These features (i.e., edge space and angle) are input to an ANN model, such as RNN or GNN, for training. The results generated from the developed system that uses real-world visual-inertial odometry have shown that the proposed biomimetic approach is able to position objects on a map based on their motion trajectories.

Referring to FIG. 3, the location learning may be performed by the following functional blocks. In block 310, step 1, a map M may be represented as a graph G with a plurality of nodes $V=\{v_1, v_2 \ldots v_n\}$ and edges $E=\{e_1, e_2 \ldots e_n\}$, wherein: each of the nodes $v_1, v_2 \ldots v_n$ is assigned with a unique identification which represents a place, and each of the edges $e_1, e_2 \ldots e_n$ is assigned with a unique identification which represents a traversable path.

In an example, the at least one map is generated from inputs from one or a combination of: a blue print, a fixed image picture, a Geographic Information System (GIS), an OpenStreetMap (OSM), A CAD model, or an underwater topographical map. The graph node's may carry features such as the geo-coordinates, centrality, place, category etc. The graph edge may carry features such as length, the orientation, and the traffic information etc.

In step 2, motion trajectory representation may be established. The motion trajectories are encoded as a sequence of motion features generated as the object either makes a turn or continues to move in a straight direction; extracting, by a processor of the object, motion based relative position signals generated from at least one device of the object, wherein the motion based relative position signals comprise time sequenced edges and nodes traversed by the object on the at least one map, wherein each node is associated with a turning angle φi which represents directional information formed at the node $v_i$ between a previous edge $e_{i-1}$ and a next edge $e_{i+1}$ of the object has traversed; generating, by the processor of the object, a relative motion trajectory of the object over n nodes $\{v_1, v_2 \ldots v_n\}$ from one or both of n−1 distances $\{l_1, l_2 \ldots l_{n-1}\}$ and n−2 turning angles {φ1 . . . φn−2} computed from the motion based relative position signals; quantizing the n–2 turning angles φ1 . . . φn–2 to identify a given discrete bin from a plurality of discrete bins for each relative motion trajectory. In an example, the method may include using the at least one device 100 (see FIG. 1C) that generates motion based relative position signals of the object.

In steps 3 and 4, the ANN model may require training the model to learn object motion trajectories on the at least one defined map, which is then used to estimate the geolocation of the object on the at least one defined map according to the trained neural network. In an example of the model, the trained neural network that embeds the map graph on a multi-dimensional manifold may include a GNN model or an RNN model that may have layers of neurons having feedback loops 302 for processing one-time sequenced edge and node at a time to learn a location of the object on the at least one map.

Given an object trajectory fusion of visual and inertial sensors (see VIO 100 in FIG. 1C) may be used to generate a trajectory j, a motion feature sequence X may be generated by quantizing turning angles and the distances traversed. Using this sequence X, the position of the object may be defined as the edge $e_i$ connected to the last node visited $v_{i-1}$. Therefore, the object localization problem becomes a variable-length sequential data classification problem in embedding. In an example, the embedding may be a nonlinear function $f$ that learns the map M:

f: X→Y, wherein input feature sequence: X=(φ1, φ2, . . . φn), where φi∈R, (i=1, 2 . . . n), n is the length of sequence and φi is ith angle or X={$l_1$, $l_2$ . . . $l_{n-1}$}; and an output position label:

Y=$e_i$, $e_i$∈E, where E={$e_1$, $e_2$ . . . $e_k$} is the output label space, k is the number of edges in the topological map, and the function $f$ is the trained RNN that learns the map M.

In an example, the RNN 400 (see FIG. 4) may be composed of layers of neurons that have feedback loops and have the ability to process transient sequences. In an example, this RNN architecture may model the dependencies between the map nodes $v_i$, $v_{i+1}$, etc., hence preserves the transition of state between consecutive time steps. In the most general form, the RNN (see FIG. 4) may be the function of time t that takes the current input $x_t$, the previous hidden state $h_{t-1}$and produces a new state $h_t$ through a non-linear activation function $f$ and g: the trained RNN that learns the location of the object on the at least one map M may be defined by past object state:

$$h_t = f(x_t, h_{t-1})$$

$$y_t = g(h_t)$$

In another embodiment, the trained GNN input sequence $x_t$ at one instance a time t, and the output sequence $y_t$ generated at each time instant t, would depend on all previous hidden states $h_{t-1}$ inputs, the non-linear function $f$: and produces a new state through a non-linear activation function $f$ and g:

$$h_t = f(W \cdot x_t + U \cdot h_{t-1} + b_h);$$

$$y_t = g(V \cdot h_t + b_y)$$

where, U; V; W are weight matrices. $h_t$ and $y_t$ are hidden output and final output, and $b_h$ and $b_y$ are bias terms.

Figure 5:
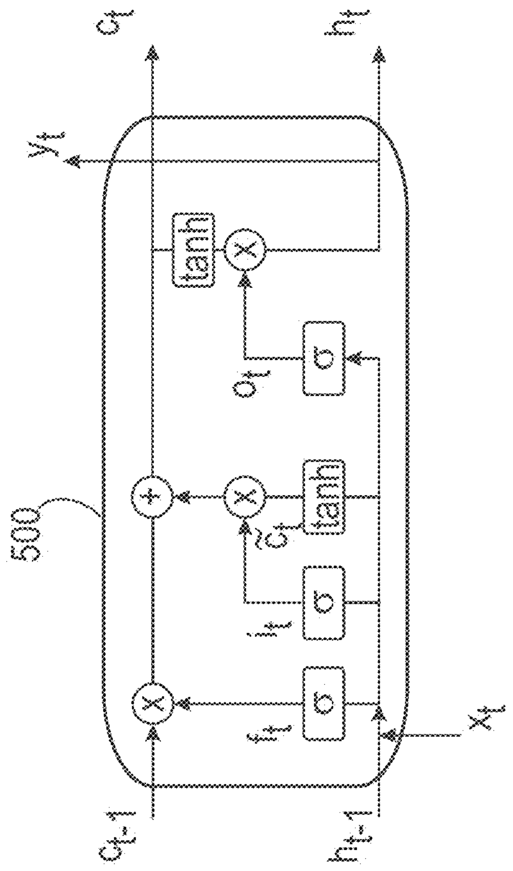
FIG. 5 illustrates a structure of an LSTM cell.

The RNN network 400 is not only cyclic but deep which makes training a difficult problem as it causes gradient vanishing and gradient explosion, even when special algorithms such as backpropogation through time (BPTT) are used (Werbos et al., 1990). One solution or improvement that overcomes these shortcomings is the Long Short-Term Memory (LSTM) network 500 (Hochreiter, Schmidhuber, 1997) in FIG. 5, which use internal cyclic mechanisms called gates that overcome gradient vanishing problem, wherein each angle in the sequence generated by a preprocessing phase is fed into the LSTM network 500 one by one (see FIGS. 8A and 8B). These gates illustrated in FIG. 5 include forget gate $f_t$, input gate $i_t$ and output gate $o_t$ where, $x_t$ is the input in time t. W and b represent weight matrices and bias terms for each gate. $c_t$ and $h_t$ are the LSTM cell output.

Figure 6:
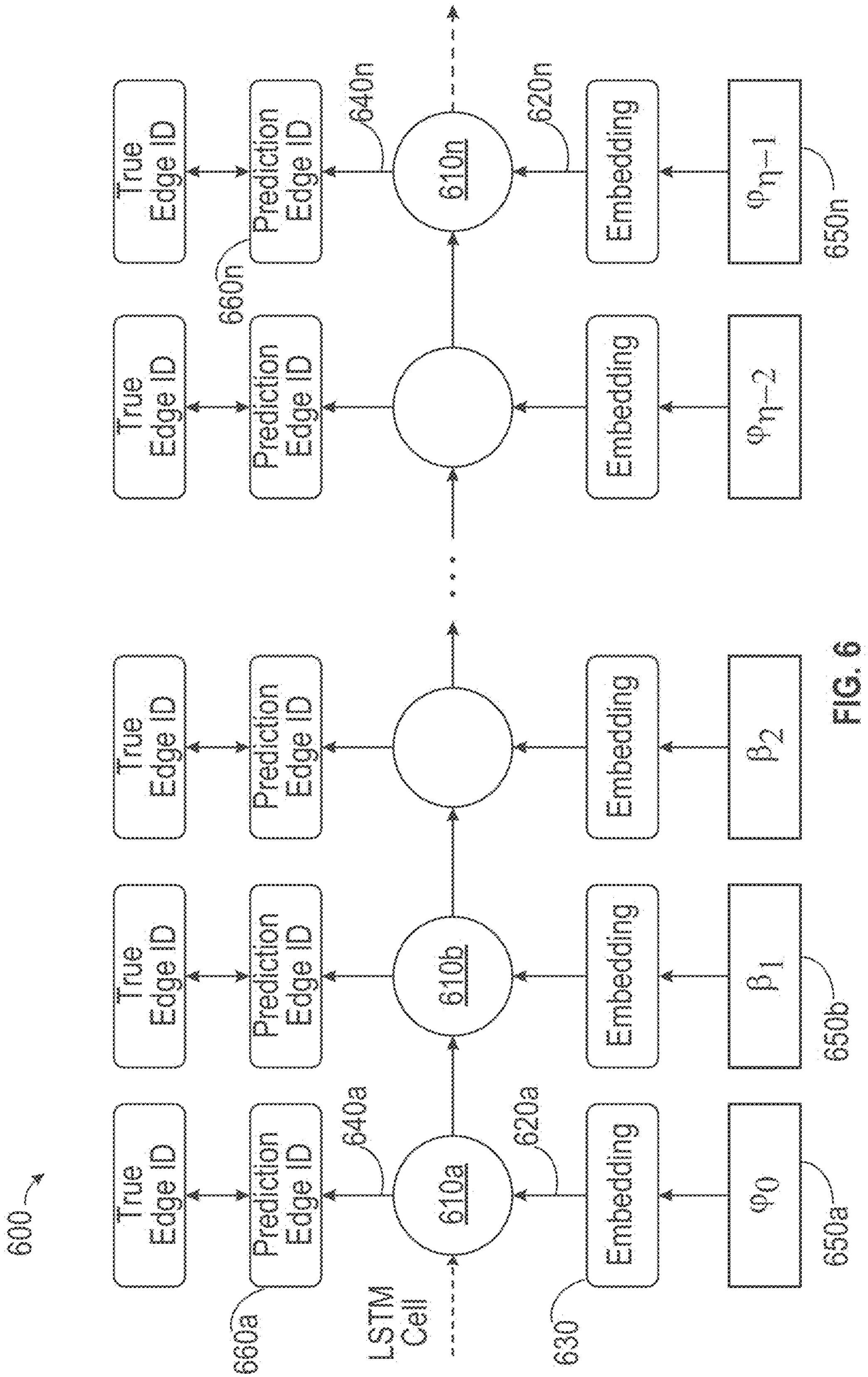
FIG. 6 illustrates a Recurrent Neural Network (RNN) which is used for processing input sequence to generate a trajectory of a traveling object.

FIG. 6 illustrates a Recurrent Neural Network (RNN) with multiple outputs, which is used for processing input sequence to generate a trajectory of a traveling object. Trajectory localization problem can be thought of having three degree of freedom (DoF) (x; y; z). The use of the RNN in FIG. 6 may reduce the three degree of DoF complexity into one DoF due to the use of a sequence of turning angles at nodes. Each angle in the sequence generated by the preprocessing phase may be fed into the LSTM network cells 610*a*-610*n*, one by one as shown in FIG. 6. An embedding layer 430 may be attached to input layer 420*a*-420*n* as a high-dimensional representation of discrete scalar input. The output 640*a*-640*n* in each time step generates the edge 660*a*-660*n* on which the object makes the last significant turn. A softmax function may be employed to calculate a probability of each output class which corresponds to a unique edge id in a given map graph using equation (4):

$$P(Y = i|y) = softmax(y) = \frac{e^y}{\sum_{j=0}^{k} e^y} \tag{4}$$

where z is the final linear output, and Y represents the output edge id which is equal to i.

To train the network, a negative log likelihood loss (NLL) on the edge probabilities may be performed using equation (5):

$$L_i = -\log(p_{yi}) \tag{5}$$

In another example, a topological map-based approach using motion trajectories j as training data may achieve self-localization. Formally, given a sequence X of distances {$l_1$, $l_2$ . . . $l_{n-1}$} and turning angles φ1 . . . φn–2 with a map M, one may sequentially predict which edge $e_i$ may be located. However, the movement of object on graph G may be physically constrained by the fact of the topology of an underlying road network. In order to guarantee the connectivity of edge prediction, we adopt hypotheses generations and pruning strategy (see FIGS. 8A, 8B). Due to distance information needed, our approach requires absolute scale of motion trajectories. This requirement directly leads us to employ stereo visual odometry method (see FIG. 9) to obtain motion trajectories.

Main Method: 1. Motion Learning and Edge Localization: A mathematical model may be developed that encode biological system's treatment of spatial topological map for navigation and localization using neural network structure in a motion learning framework (see FIG. 2). The proposed motion learning process utilizes motion on a given map in the form of a sequence of discrete distance and direction. Formally, given a map and a sequence of distance and direction information, an artificial neural network may be trained to solve the output edge location probability which is defined as follow:

$$P_{loc} = P(s_t|\varphi, \beta_{1:t}, M)$$

where $P_{loc}$ indicates the output result which is written as conditional probability. M is topological map and $\varphi$, $\beta_{1:t}$ represents a sequence of direction and distance where t is the length of sequence. $s_t$ is the output edge id.

Figure 7:
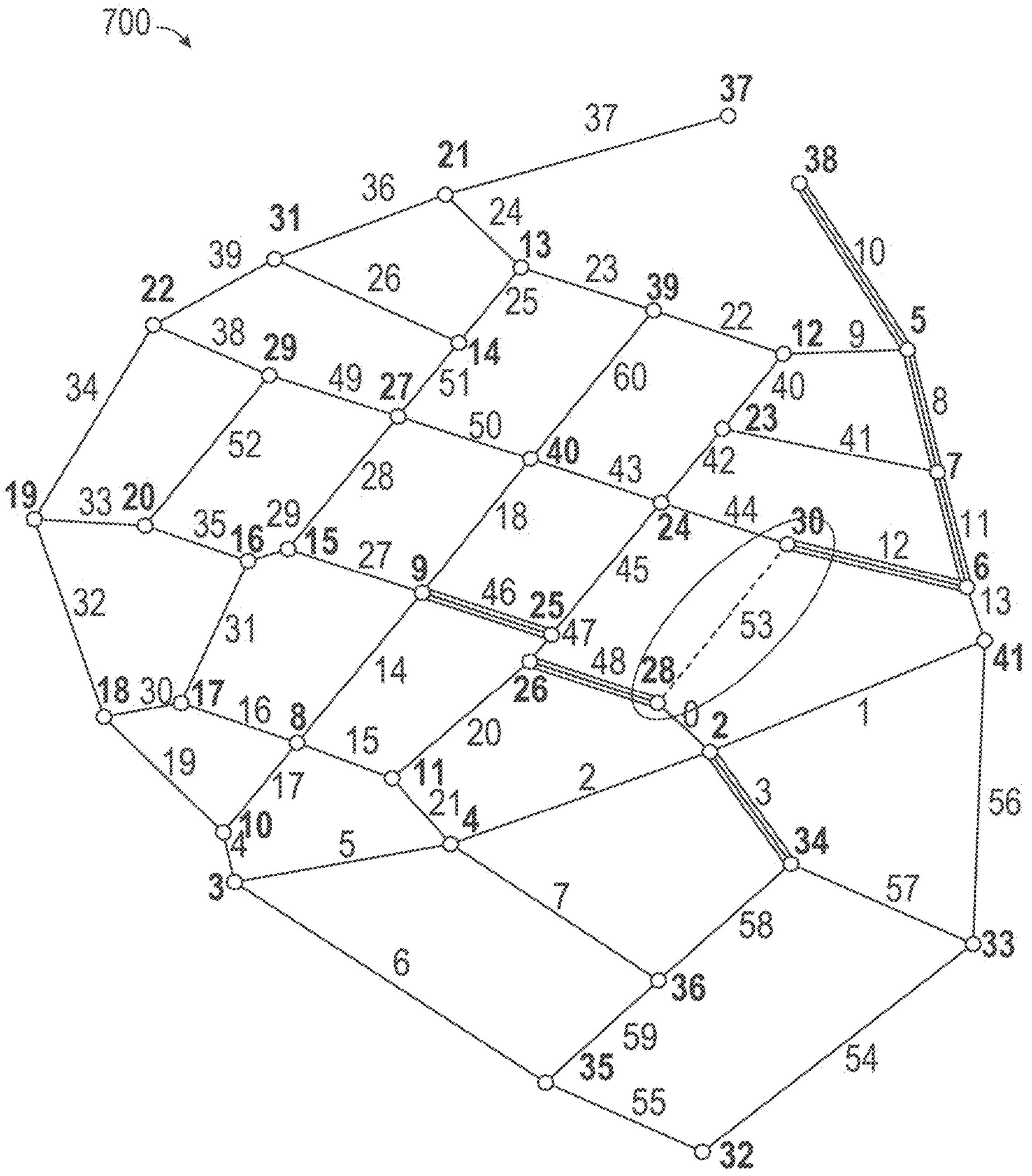
FIG. 7 illustrates an example of inconsistent edge localization.

FIG. 7 illustrates an example of inconsistent edge localization. Temporal Positioning Consistency: The motion learning process may take a sequence of trajectory features X as its input and its corresponding geolocations as output $y_t$ to train the underlying neural network (e.g., RNN or GNN). The training process using this sequence implicitly introduces temporal consistency to the estimated object positions. However, the output $y_t$ may depend only on the past state $h_{t-1}$ which may break the temporal consistency and that the sequence of output edge ids become inconsistent on the map.

An example of this undesired phenomena may be shown in FIG. 7, where the algorithm skips the (circled) dotted line 53 which is what should have been predicted and instead choosing two other wrong edges 46, 48 that are not connected; hence are temporally inconsistent.

Figure 8A:
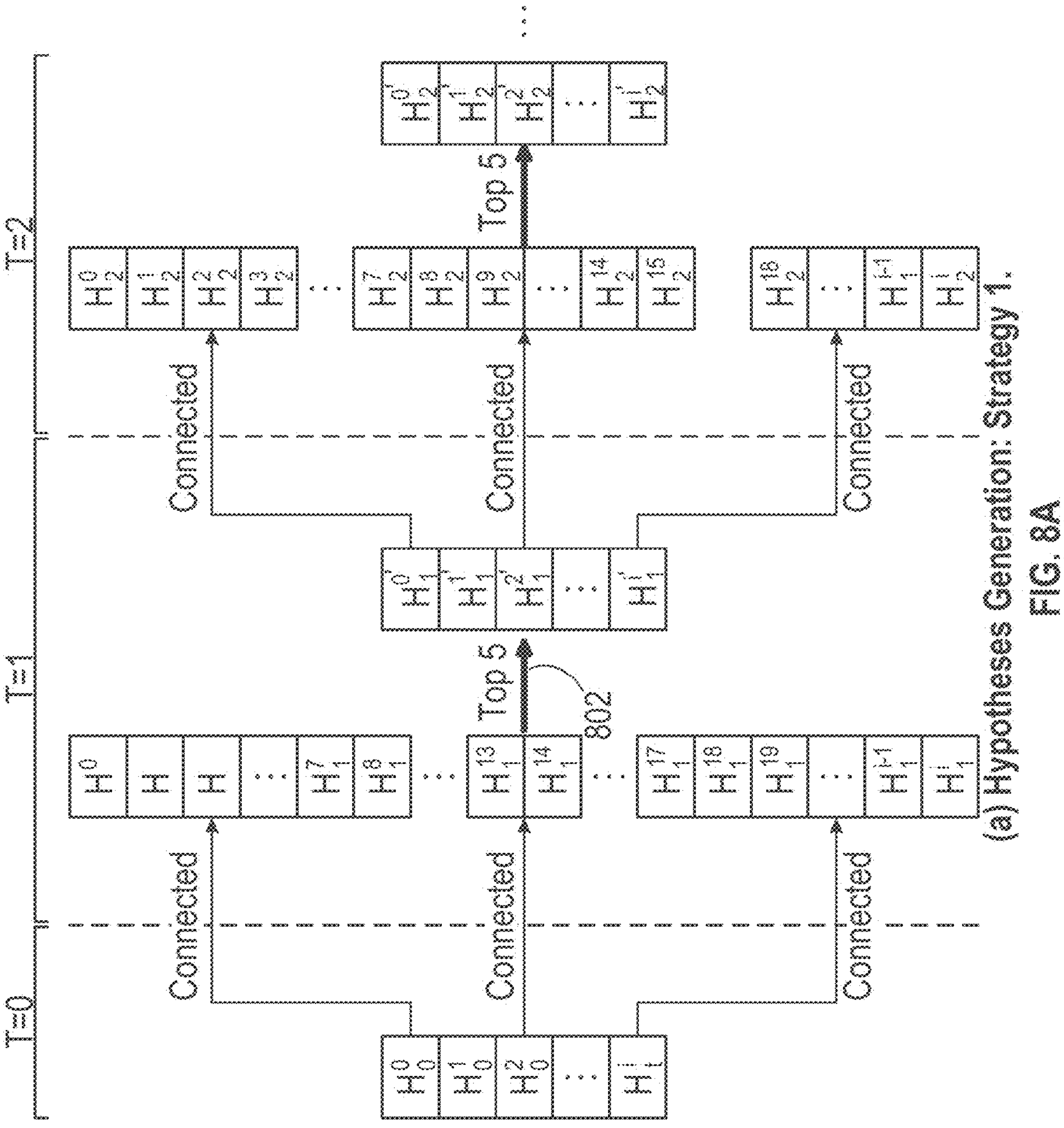
FIGS. 8A and 8B illustrate two different strategies to deal with temporal consistency.
Figure 8B:
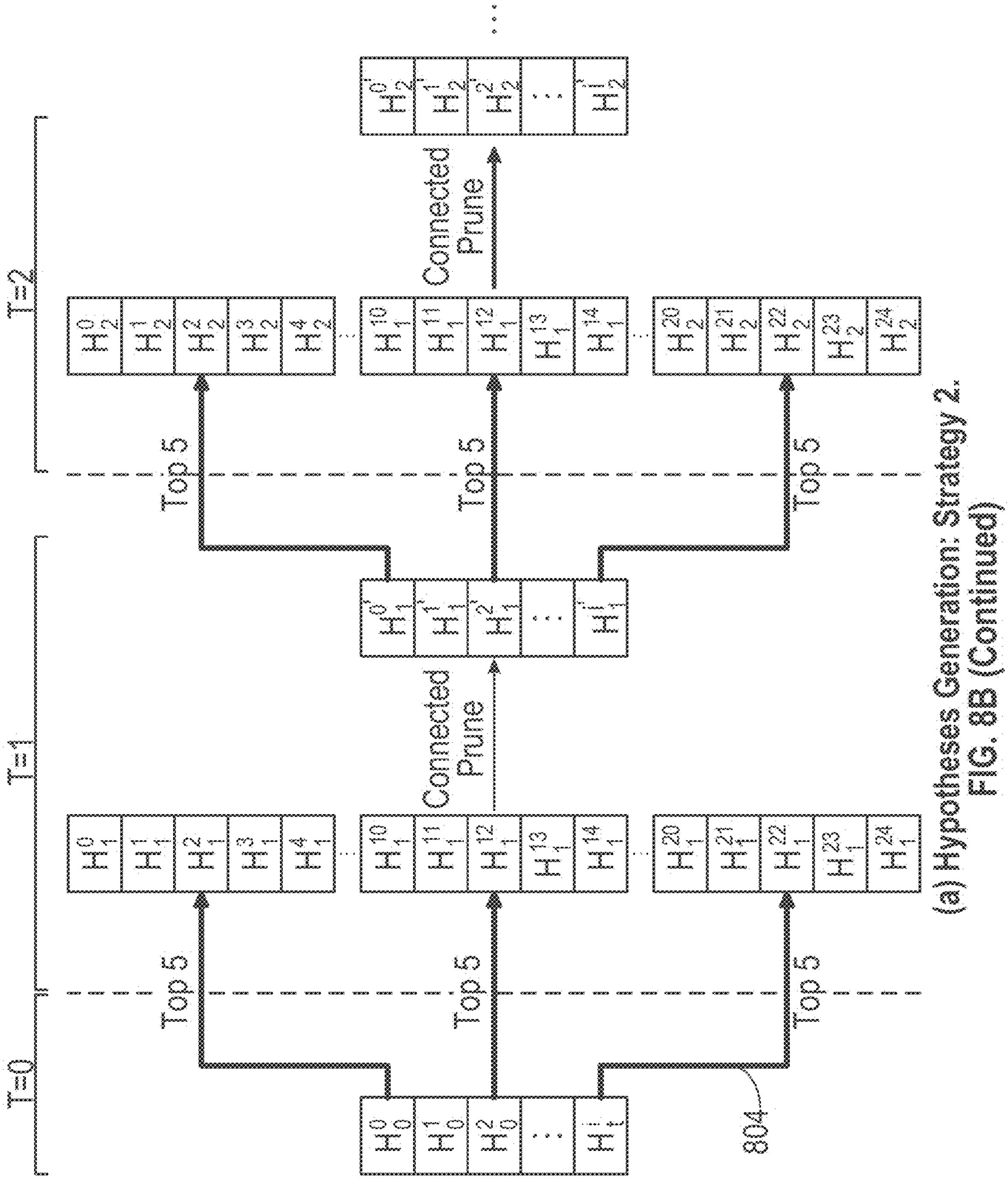

In order to deal with this temporal inconsistency, it is proposed that two different multiple hypotheses generation and elimination strategies during the incremental localization as illustrated in FIGS. 8A, 8B.

Track hypothesis at time T(T=1; 2 . . . t) are shown by $$H_t^i$$

and 1<=i=n denotes the $i^{th}$ hypothesis from among n hypotheses at time t. In each hypothesis, the light arrow denotes the edges connected to the edge denoting the current location hypothesis; the heavy bolded arrow refers to the selection of top k hypotheses with highest probability at time t. The two strategies change in the way they select the top k hypotheses.

A hypothesis at time t−1 may be defined as $$\{H_{t-1}^i\}$$

and a new hypotheses at time t may be defined as $$\{H_t^{ij}\}.$$

A likelihood of the new hypothesis $$\{H_t^{ij}\}$$

may be defined by the likelihood ratio as equation (6):

$$P(H_t^{ij}) = \frac{P(H_t^{ij}, H_{t-1}^i)}{P(H_{t-1}^i)}$$

where i=1, . . . , n, j=1, . . . , n and $n_1$ and $n_2$ are the number of hypotheses in previous time and current time respectively.

Two strategies are similar as two different algorithms (Kruskal and Prim) in minimum spanning tree generation (MST).

Strategy 1 (Prim alike): first consider the connectivity and select top k edges. As shown in FIG. 8A, the algorithm generates a new location hypothesis at current time t for each edge connected to the previous edge defined by the hypothesis at time t−1. At t=0, all edges in the map are used to generate location hypotheses as we do not know where the object starts the traverse. In subsequent time instants, the probability of each of the hypotheses is computed by conditioning it on the previous location hypothesis. The number of hypotheses in this approach can be combinatorially explosive, hence, for computational reasons, one can keep only the top k location hypotheses. In an example, one may set k=5. Considering the way each hypothesis is generated based on the connectivity rule, temporal consistency of the location estimation is guaranteed.

Strategy 2 (Kruskal alike): first select top k edges and then consider the connectivity. As shown in FIG. 8B, the algorithm generates k location hypotheses with the highest probability based on the previous hypothesis at time t−1. The strategy proceeds by eliminating improbable hypotheses based on the edge connectivity constraint. While this method produces temporally consistent trajectories in the form of sequence of edges, it may suffer from the possibility that the true prediction might not be in the first top k hypotheses which may lead to an inconsistent prediction. Later in the experiments section, one may show results that illustrates such inconsistencies and compare them with the strategy 1.

Figure 9:
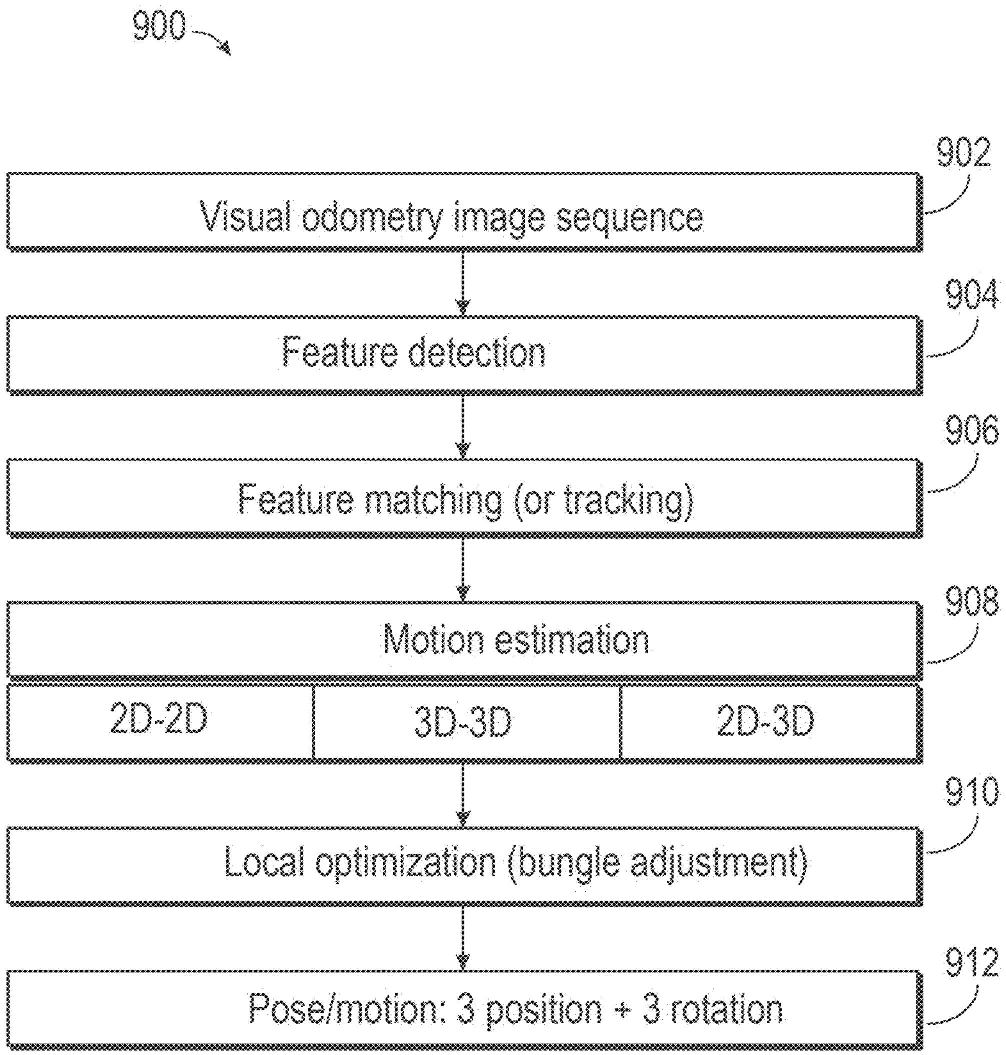
FIG. 9 illustrates a visual odometry pipeline for motion trajectory generation.

FIG. 9 illustrates a visual odometry pipeline for motion trajectory generation. The distance information used as a motion features may be encoded with the object's trajectory which may require to generate a metric trajectory by utilizing the visual odometry (see steps 902-904). The visual odometry may estimate a motion trajectory Tr with six degrees of freedom including 3D position and orientation of the platform using image data (see step 908). Visual odometry may estimate the relative motion trajectory from a single camera (monocular) setup or from a stereo camera setup. In this disclosure, a stereo setup with known calibration may be used. Using this information, one may estimate the relative rotation R and translation T by detecting and matching features between consecutive image frames. These matching points are then used in photogrammetric intersection framework to estimate instantaneous relative motion R and T (see steps 910-912), and may obtain a sequence of metric points as motion trajectory Tr.

The motion trajectory Tr is produced using the angle sequence as training data input X to RNN. The output data Y that corresponds to this training data are the edge ids on which the last turn occurs. The VINS-Fusion 130 (see FIG. 1*c*) may be used as the visual odometry approach to generate 3D trajectories.

The motion learning may be formulated as a conditional variable sequence prediction problem using RNN as shown in FIG. 6. The generated training trajectory dataset may be used to train the RNN where each input is a discrete angle φi and the output is corresponding edge id. Considering that learning the map M is a multi-class classification problem, at each time instant t, a cross-entropy function may be utilized as the loss function for measuring the training performance. One may choose a stochastic gradient descent as optimization method.

In FIG. 7, it was shown that the accuracy of localization as a function of length of trajectory segment. An accuracy of geolocation as a function of length of trajectories segment may be computed as using equation (7):

$$\text{Accuracy}(i) = \frac{1}{N}\sum_{j=0}^{N} T_{ji} \tag{7}$$

$T_{ji}$ is correctness of prediction, {0, 1}, on i-th node of trajectories j and N is a total number of training trajectories used to generate a plot.

One should note that using the accuracy at the i-th node refers to the accuracy of having a trajectory of length i. It may be observed that the accuracy increases with increase in the length of trajectory from 1 to entire trajectory segment. Considering the input angle and output edge are mapped to each other, as vehicle traverses the map, the spatial uncertainty of its whereabouts reduces to a single location hypothesis. This observation is supported by the fact that the longer the trajectory becomes, it would fit only to a certain map location due to increase in accuracy.

While particular examples above have been illustrated and described herein, it should be understood that various other changes and modifications may be made without departing from the spirit and scope of the claimed subject matter. Moreover, although various aspects of the claimed subject matter have been described herein, such aspects need not be utilized in combination. Accordingly, it will be appreciated that the above described examples should not be construed to narrow the scope or spirit of the disclosure in any way. Other examples, embodiments, aspects, and advantages will become apparent from the following detailed description taken in conjunction with the accompanying drawings. It is therefore intended that the appended claims cover all such changes and modifications that are within the scope of the claimed subject matter.

What is claimed is:

1. A method for determining object motion trajectories, comprising:

in response to receiving motion based sequence of discrete distances $\{l_1, l_2 \ldots l_{n-1}\}$ and directions {φ1 . . . φn−2} of object's trajectories at time $t_i$ generated from at least one device of an object that traverses within a map M, executing by a processor, an algorithm stored in a memory of the at least one device of the object to perform steps, comprising:

determining a geolocation probability $P_{loc}$ of an object according to the sequence of discrete distances $\{l_1, l_2 \ldots l_{n-1}\}$ and directions {φ1 . . . φn−2} of object's trajectories at the time t, wherein the geolocation probability $P_{loc}$ of the object's motion trajectories as equation (1):

$$P_{loc} = P(s_t|\phi, \beta_{1:t}, M) \tag{1}$$

where, $s_t$ is an output edge id, and the $P_{loc}$ indicates an output result conditioned on the topological map M, and the sequence of direction with a turning angle φi at a node $v_i$ and a distance β between nodes, where t is time sequence.

2. The method of claim 1, comprising:

training a recurrent neural network (RNN) to determine the object motions output $y_t$ over the time sequence t based on hidden states $h_s$ expressed as equation (2):

$$h_s = f_\alpha(x_s, h_{s-1}) \tag{2}$$

$$y_t = f_\beta(h_t)$$

where $f_\beta$ is a linear function, $f_\alpha$ is a non-linear function, $x_t$ is a current input, $h_{t-1}$ is a previous hidden state.

3. The method of claim 2, comprising:

using equation (2) to calculate an edge probability of each output Y with an edge id i at the time sequence t according to a softmax function as equation (3):

$$P(Y=i|y) = \text{softmax}(y) = \frac{e^y}{\sum_{j=0}^{k} e^y} \tag{3}$$

4. The method of claim 3, comprising training the RNN using a negative log likelihood loss (NLL) on the edge probability in equation (3) based on equation (4):

$$L_i = -\log(p_{y_i}) \tag{4}$$

wherein $L_i$ is a loss likelihood.

5. The method of claim 4, comprising determining temporal inconsistencies in the geolocation probability of the object's motion trajectories due to loss likelihood, by determining a conditional probability of hypothesis at the time sequence t using equation (5):

$$P(H_t^{ij}|H_{t-1}^i) = \frac{p(H_t^{ij}|H_{t-1}^i)}{P(H_{t-1}^i)} \tag{5}$$

wherein i=1, . . . , $n_1$, j=1, . . . , $n_2$ and $n_1$, $n_2$ are number of hypotheses in previous time sequence t−1 and current time sequence t.

6. The method of claim 5, comprising generating object's motion trajectories utilizing visual, inertial or visual-inertial odometry with six degrees of freedom including three-dimensional (3D) position and orientation using image data from a camera by detecting and matching features between consecutive frames, wherein the image data for features matching comprising relative rotation R and translation $\mathcal{T}$.

7. The method of claim 6, comprising computing an accuracy of geolocation as a function of length of trajectories segment, using equation (6):

$$\text{Accuracy}(i) = \frac{1}{N}\sum_{j=0}^{N} T_{ji} \tag{6}$$

$T_{ji}$ is correctness of prediction, {0, 1}, on i-th node of trajectories j and N is a total number of training trajectories used to generate a plot.

* * * * *